UNITED STATES PATENT OFFICE.

JOHN L. RANDALL, OF BROOKLYN, NEW YORK.

METHOD OF AND COMPOSITION OF MATTER FOR SMELTING TITANIC IRON ORE.

SPECIFICATION forming part of Letters Patent No. 528,804, dated November 6, 1894.

Application filed March 1, 1894. Serial No. 501,991. (No specimens.)

*To all whom it may concern:*

Be it known that I, JOHN L. RANDALL, a citizen of the United States, residing at Brooklyn, in the county of Kings and State of New York, have invented a new and useful Method and Composition of Matter for Smelting Titanic Iron Ore, of which the following is a full, clear, and exact description.

Heretofore, it has been found difficult and unprofitable to conduct the smelting of titanic iron ore in a blast furnace, as from its peculiar nature, such iron ore has a tendency to assume a viscid or pasty consistency if charged in a furnace with an ordinary flux, this resistance to fluid reduction of the metal in the ore tending to clog up the air inlets or boshes and preventing a satisfactory operation of the furnace. Furthermore, if there is such an excess of ordinary fluxing material employed as will cause the metal to separate from the slag, such a washing or excoriating action on the furnace lining is produced as will in a short time render the latter useless until repaired.

By the use of my improved process and newly invented composition of matter in combination with the titanic ore, the latter may be profitably smelted in an ordinary furnace and the operation be continuously conducted without injury to the walls of the furnace, on a large commercial scale.

The following is a formula of ingredients and proportions therefor that may be advantageously employed for the reduction of the titanic iron ore, it being understood that when the proper conducting of the smelting operation requires it, the proportions of materials used is to be changed, as will be further explained: titanic iron ore, one hundred parts; puddling furnace slag, fifty parts; cast iron scrap, twenty-five parts; feldspar flux, fifty parts; anthracite or other coal, one hundred parts.

As before mentioned the above stated proportion of ingredients to a ton of the titanic iron ore may be altered according as the furnace may be working; as, for instance, if it is found that on account of a change in the nature of the ore, or from other causes, the furnace works slowly, and the delivery when the latter is tapped becomes thick and pasty, the slag and feldspar should be increased in quantity, until a satisfactory working of the furnace results. On the other hand, if the furnace works too freely, and the melted materials have a tendency to scour the walls of the furnace, more titanic ore is to be added, until the scouring is corrected and a proper fluid consistency is attained for the melted material.

To correctly charge a furnace, the titanic ore, slag and feldspar should be broken into lumps about the dimensions of a hen's egg, before placing in the furnace, the scrap iron should be broken into moderately sized fragments, and the coal used by preference should be in lumps of considerable size.

Any suitable variety of coal may be utilized, it being necessary for good results that the coal be devoid of sulphur, or measurably so.

The products resulting from the smelting of titanic iron ore by the specified method, and with the composition of matter stated, is a superior cast iron which may be subsequently converted into wrought iron or steel if desired; the cost of operating the furnace for the reduction of the titanic ore not exceeding that entailed in the smelting of ordinary iron ore.

It is also contemplated to use gaseous fuel or coke in lieu of coal in some cases, but coal of a suitable quality is preferred.

What I claim as new, and desire to secure by Letters Patent, is—

1. The herein described method for smelting titanic iron ore, consisting in the employment of a flux with said ore, composed of cast iron fragments, puddling furnace slag, feldspar, and a suitable fuel, all combined in a blast furnace and heated to a melting point, as herein set forth.

2. The herein described composition of matter for smelting titanic iron ore, consisting of puddling furnace slag, cast iron scrap, feldspar and coal, about in the proportions specified.

JOHN L. RANDALL.

Witnesses:
WM. P. PATTON,
JNO. M. RITTER.